June 5, 1934.  C. L. BASTIAN  1,961,732
AUTOMATIC VALVE
Filed June 23, 1930  3 Sheets-Sheet 1
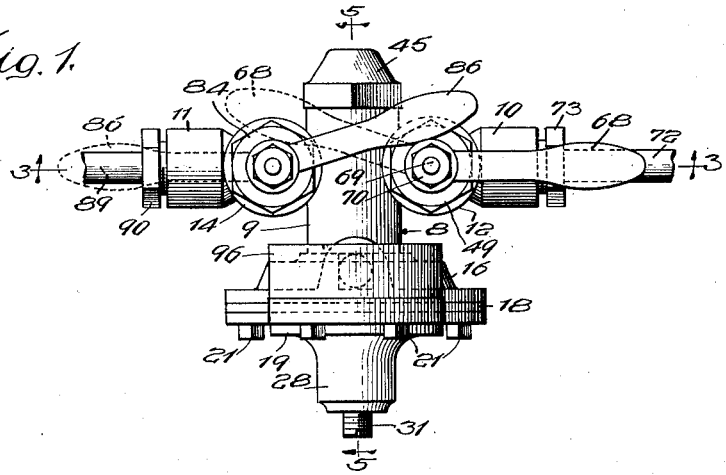
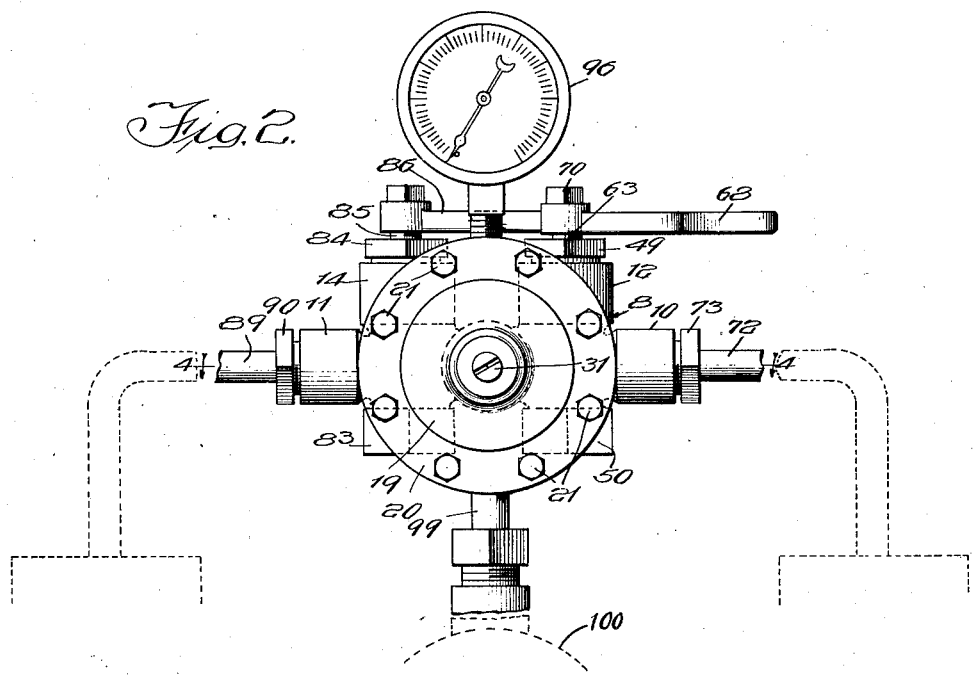

June 5, 1934.    C. L. BASTIAN    1,961,732
AUTOMATIC VALVE
Filed June 23, 1930    3 Sheets-Sheet 2

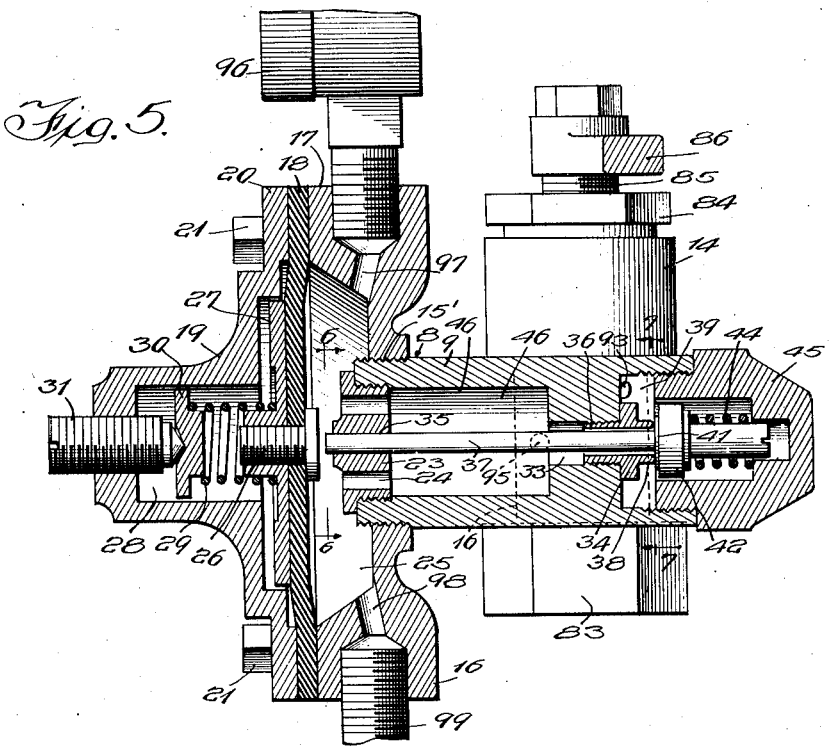
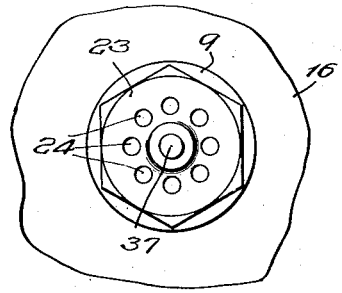
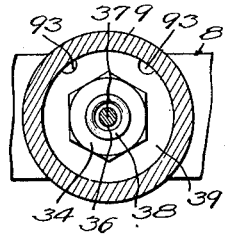

Patented June 5, 1934

1,961,732

UNITED STATES PATENT OFFICE 1,961,732

AUTOMATIC VALVE

Charles L. Bastian, Chicago, Ill., assignor to The Bastian-Blessing Company, Chicago, Ill., a corporation of Illinois Application June 23, 1930, Serial No. 462,955

15 Claims. (Cl. 137—153)

This invention relates to automatic valves and more particularly to valves adapted to be used in connection with a gas supply system employed for heating or lighting. Gas, in liquid form, is supplied in suitable containers which are connected to a system having gas using devices connected thereto. Such devices, for example, may be cooking stoves, lighting fixtures or the like. It has been the custom in the past to provide an arrangement wherein two containers would be included; one of these containers being used as a service container, and the other container as a reserve. An ordinary two-way valve is usually provided to permit changing from one container to the other. This arrangement, however, embodies many disadvantages, for usually the containers are located at a point remote from the use of the gas and therefore when the gas supply diminished or exhausted, it was necessary to go to the location of the containers to change the valve, which was commonly located near these containers. Gas, of the character to which this invention appertains, is propane, butane and similar hydrocarbon gases. As stated, these gases are furnished in a liquid form in suitable containers and during use this liquid gasifies or boils, thus furnishing a supply in a gaseous state. This gasifying reduces the temperature of the liquid and as the pressure is determined by the temperature, it is possible that the temperature will be reduced to a point at which gasification will cease, and this often occurs when the gas is used in large quantities. As stated, it has been customary to provide an ordinary two-way valve to permit shifting from a service container to a reserve container for a supply of gas and a pressure reducing valve has been customarily associated with this two-way valve because the pressure of the gas as delivered from the containers is much too high for satisfactory use. Some of the disadvantages entailed in the use of an ordinary two-way valve have been set forth above and it is the salient object of this invention to provide a valve arrangement which will automatically function to change from a service container to a reserve container when the pressure of the gas from the service container falls to a predetermined low point, which may be brought about by exhausting the supply of gas in the service container, or reduction of the temperature in the manner above set forth, or by other causes.

Other objects are to provide a valve which may be so arranged that two containers may be associated therewith and to arrange the valve so that either of the containers may be used as the service container or the reserve container; to provide a valve which may be expeditiously adjusted to bring about a change from one container to another at any desired or proper pressure; to provide a valve which may be manually operated to bring about a changing from one container to another; and to provide a valve so arranged that one or both of the containers may be completely isolated from the system to permit replacement thereof.

Further objects are to provide a novel valve of the above described character which will be positive in operation, efficient in use, and simple and economical in construction.

A selected embodiment of the invention is illustrated in the accompanying drawings wherein:

Fig. 1 is a top plan view of a valve constructed in accordance with the invention;

Fig. 2 is a front elevation of the valve illustrated in Fig. 1;

Fig. 5 is a vertical section taken substantially on the line 5—5 on Fig. 1;

Fig. 6 is a detail view taken substantially on the line 6—6 on Fig. 5; and

Fig. 7 is a section detail view taken substantially on the line 7—7 on Fig. 5.

Figure 3:
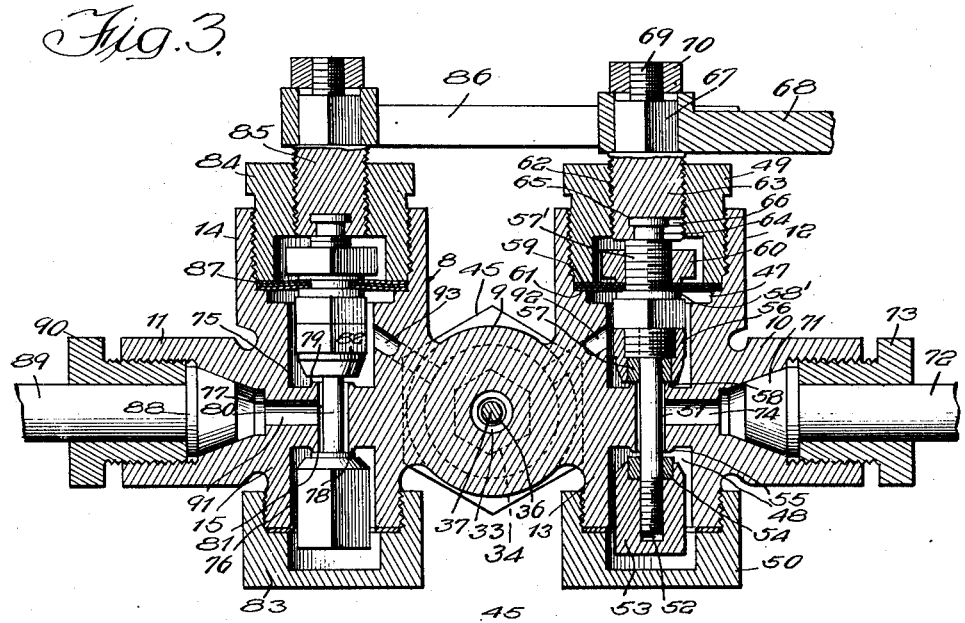
Fig. 3 is a vertical section taken substantially on the line 3—3 on Fig. 1.
Figure 4:
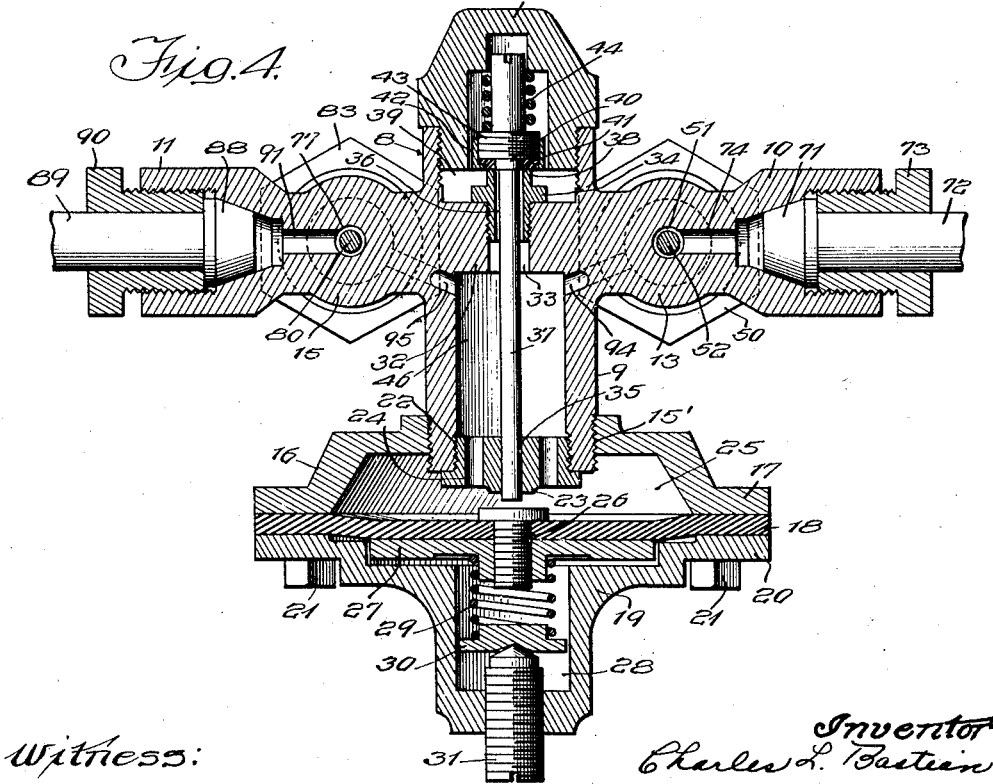
Fig. 4 is a horizontal section taken substantially on the line 4—4 on Fig. 2.

The valve as disclosed in the accompanying drawings includes a main body generally indicated as 8, which includes a central tubular portion 9, from one end of which branches 10 and 11 are extended at right angles to the extent of the tubular portion 9. If, for example, the tubular portion 9 is arranged to extend horizontal, the branches 12 and 13 extending at right angles to the branch 10 may be said to extend vertically and similar branches 14 and 15 are similarly extended from the branch 11. The forward end of the central tubular portion 9 is screw threaded as indicated by 15' and the central portion of a dish-shaped body 16 is mounted on these screw threads 15', which body includes a peripheral ring 17 having a flat face. The edges of a diaphragm 18 are disposed in engagement with the flat face of the ring 17 and a cap 19 is provided which includes a peripheral ring 20, the ring 20 being disposed in alinement with the ring 17 to abut the opposite face of the diaphragm 18. In the rings 17 and 20 and in the marginal edge of the diaphragm 18 are a plurality of alined holes, through which bolts 21 are extended, the bolts 21 freely passing through the openings in the ring 20 and the diaphragm 18 and being screw threaded into the openings of the ring 17. In this manner the cap 19 is connected to the body 16 and the diaphragm 18 is clamped in position. The diaphragm 18 may be made of any suitable material; for example, laminated rubber or the like. The inner peripheral surface of the tubular member 9, at the end having the screw threads 15' thereon, is screw threaded as indicated at 22. A nut 23 is secured to these screw threads 22 and the shoulder on this nut abuts the ends of the tubular portion 9 and thus the nut 23 closes the end of this tubular portion, a plurality of openings 24 being provided in the nut 23 to establish connection between the area within the body 16 closed by the diaphragm 18, which will be known hereafter as the pressure chamber 25, and the interior of the tubular portion 9. At the center of the diaphragm 18 a screw 26 is arranged with the head thereof disposed in the pressure chamber 25. The stem of this screw 26 extends through the diaphragm 18 and is connected to the central bearing portion of the flat plate 27 arranged on the opposite side of the diaphragm 18 and thus the diaphragm is clamped between the plate 27 and the head of the screw 26. A pocket 28 is provided at the central portion of the cap 19, in which a spring 29 is arranged, one end of said spring embracing the bearing portion on the plate 27. At the opposite end of this spring is a cap plate 30 engaged by the inner end of an adjusting screw 31 extended through the outer end of the pocket 28. By varying the position of the adjusting screw 31, the tension of the spring 29 may be varied, which in turn will vary the pressure on the diaphragm 18 for a purpose to be set forth hereinafter. In the tubular portion 9 in alinement with the branches 10 and 11 there is a web 32 having a central opening 33 therein. A nut 34 has a stem portion thereon extended into this opening 33 and the shoulder of the nut 34 engages the face of the web 32 disposed away from the nut 23. In the nut 23 there is an axial central opening 35 and in alinement therewith an opening 36 is provided in the nut 34. A stem 37 is extended through these openings 35 and 36 and one end thereof is alined with the head of the screw 26. A valve seat 38 is provided on the nut 34, which valve seat is arranged in what will be hereinafter termed the reserve chamber 39. On the stem 37 there is an enlarged portion 40 and the resilient washer 41 is disposed thereon. A cap 42 embraces the resilient washer 41 and a nut 43 extends into the cap 42 and clamps the resilient washer 41 in position. The resilient washer 41 is seated on the valve seat 38 by the spring 44 disposed between the nut 43 and the nut 45, about the outer end of the stem 37. The nut 45 engages the adjacent end of the tubular portion 9 and closes and defines the reserve chamber 39. The area between the web 32 and the nut 23 will be known hereinafter as the supply chamber 46.

In the branches 12 and 13 pockets 47 and 48 are provided, closed by nuts 49 and 50, a passage 51 extending through the branch 10 to interconnect these pockets. A valve stem 52 is provided on one end of which a nut 53 is arranged, which nut 53 retains a valve member 54 in position, said valve member 54 being adapted to cooperate with a valve seat 55 in the pocket 48 and the opposite end of the valve stem 52 has a nut 56 thereon which retains a valve member 57 in position, the valve member 57 co-operating with the valve seat 58 in the pocket 47. The valve member 56 includes a screw threaded stem portion 57' and has a shoulder 58' thereon about this stem portion. Resilient washers 59 rest on the shoulder 58' and are retained in position by a nut 60 mounted on the stem portion 57'. The marginal edges of the washers 59 rest on a shoulder 61 in the pocket 47 and are held in engagement with the shoulder by the inner end of the nut 49. A central opening 62 is provided in the nut 49 and a screw member 63 is extended therethrough. A stem 64 on the upper end of the stem portion 57' includes an enlarged head 65, which is connected in a socket 66 in the lower end of the screw member 63. The upper end of the screw member 63, extending beyond the nut 45, has a polygonal-shaped portion 67 to which the socket portion of the handle 68 is attached, a stud 69 on the outer end of the screw member 63 receiving a nut 70 to retain the handle 68 in position. When the handle 68 is turned the screw member 63 is rotated to be moved either up or down, dependent upon the direction of rotation. The valve members 57 and 54 are arranged in adjusted positions so that when the screw member 63 is moved downwardly, the valve member 57 will seat on the valve seat 58, while the valve member 54 will be unseated from the valve seat 55. When the screw member 63 is moved upwardly, the valve member 57 will be unseated, while the valve member 54 will be seated. In the outer end of the branch 10 there is a pocket 71 and one end of a conduit 72 is connected therein by a nut 73. A passage 74 interconnects the inner end of the pocket 71 and the passage 51. In the branch 14 there is a pocket 75 and in the branch 15 there is a pocket 76, which pockets are interconnected by a passage 77. A valve seat 78 is provided in the pocket 76 and a valve seat 79 is provided in a pocket 75. A valve stem 80, similar to valve stem 52, carries a valve member 81 which co-operates with the valve seat 78 and this valve stem also carries a valve member 82, which cooperates with the valve seat 79. A nut 84 closes the pocket 75. In the nut 84 a screw member 85, similar to the screw member 63, is provided. A handle 86 is connected to the screw member 85 in the same manner in which the handle 68 is connected to the screw member 63. The valve arrangement in the branches 14 and 15 are identical as those in the branches 12 and 13 in that washers 87 are provided, which are similar to the washers 59, it of course being understood that the washers 59 are flexed when the screw member 63 is moved in the manner previously described and the washers 87 are flexed when the screw member 85 is moved. When the screw member 85 is moved upwardly, the valve member 81 is seated on the valve seat 78, while the valve member 82 is unseated from the valve seat 79, and similarly, when the valve member 85 is moved downwardly, the valve member 82 is seated on the valve seat 79, while the valve member 81 is unseated from the valve seat 78. A pocket 88 is provided in the outer end of the branch 11 and a conduit 89 is connected therein by a nut 90. A passage 91 interconnects the inner end of the pocket 88 and the passage 77.

Extending between the pocket 47 and the reserve chamber 39 is a passage 92. Extending between the pocket 75 and a reserve chamber 39 is a passage 93. Extending between the pocket 48 and a supply chamber 46 is a passage 94. Extending between the pocket 76 and a supply chamber 46 is a passage 95. A pressure gage 96 is mounted on the dish-shaped body 16 and a passage 97 interconnects the inlet of this pressure gage 96 with the pressure chamber 25. A passage 98 interconnects the pressure chamber 25 with an outlet conduit 99 which is directed to a suitable pressure reducing valve 100.

In use, the conduits 72 and 89 are directed to containers having suitable gas stored therein. With the valve arranged in the manner illustrated in the drawings, the conduit 72 is connected to the service container, while the conduit 89 is connected to the reserve container. The valves are arranged in the manner illustrated in Fig. 3 with the valve member 54 unseated from the valve seat 55 and with the valve member 57 seated on the valve seat 58. Therefore, gas passing from the conduit 72 travels through the passage 74 into the passage 51 and into the pocket 48, from whence it passes through the passage 94 into the supply chamber 46. The valve member 81 is seated on the valve seat 78, while the valve member 82 is unseated from the valve seat 79. Therefore, gas passing from the conduit 89 enters the pocket 88 and passes through the passage 91 into the passage 77 from whence it passes into the pocket 75. From the pocket 75 the gas passes through the passage 93 into the reserve chamber 39. The pressure of the gas delivered from the conduit 72 is relatively high and therefore this gas passes from the supply chamber 46 through the openings 24 into the pressure chamber 25 where it exerts pressure on the diaphragm 18 and flex the diaphragm so as to disengage the head of the screw 26 from the end of the stem 37. At this same time, the spring 44 is acting to seat the valve member 41 on the valve seat 38 and thus gas in the reserve chamber 39 is prevented from passing through the passages 36 and 33 into the supply chamber 46. As long as the pressure of the gas delivered through the conduit 42 is sufficient to overcome the pressure exerted by the spring 29 on the diaphragm 18, the gas supply is withdrawn through this conduit 72 into the pressure chamber 25 in the manner set forth and from this pressure chamber 25 it passes out through the outlet conduit 99. However, when this pressure falls to a predetermined point, the spring 29 acts to move the diaphragm 18 so that the head of the screw 26 engages the end of the stem 37. Further movement is transmitted through the stem 37 to unseat the valve 41 from the valve seat 38. Therefore, gas passes from the reserve chamber 39 through the passages 36 and 33 into the supply chamber 46 from whence the gas passes through the openings 24 into the pressure chamber 25. As the pressure of this gas is relatively high sufficient pressure is soon built up in the chamber 25 to move the diaphragm to disengage the head of the screw 26 from the head of the screw 27 and therefore the valve member 41 again seats on the valve seat 38 and closes off supply from the reserve chamber 39. When the reserve chamber is in communication with the pressure chamber, both containers are in communication with the system. If the reduction of pressure of the gas supplied through the conduit 72 is due to a fall in temperature this withdrawal of gas from the reserve container may continue for a period sufficient to permit the temperature of this gas to rise so that proper action thereof will continue. However, should this period not be sufficiently long to permit this or should the gas supply in the container connected to the conduit 72 be exhausted, the foregoing action is constantly repeated; that is, gas is withdrawn from the reserve container 39 in sufficient quantities to maintain a pre-determined pressure in the pressure chamber 25. It is apparent from the foregoing description that the valve arrangements are such that the gas supply from one of the conduits is directed into the supply chamber 46, while the gas supply from the other of the conduits is directed to the reserve chamber 39. To facilitate the setting of the valves in this manner it is preferable that one of the screw members operating the valves be threaded with right hand threads, while the other screw member is to be threaded with left hand threads. Therefore, in order to arrange the valves in the manner previously described, both the handles 68 and 86 are arranged to extend in the same direction as illustrated in full lines in Fig. 1, this disposition of the handles being the one which arranges the valve members in the positions illustrated in Fig. 3. When it is desired to replace the container to which the conduit 72 is connected, the valve handles are arranged in the dotted line positions of Fig. 1. When this is done the valve member 54 is seated on the valve seat 55, while the valve member 57 is unseated from the valve seat 58. Thus, communication between the pocket 47 and the pocket 71 is established and consequently, communication between the conduit 72 and the reserve chamber 39 is established. Similarly, when the valves are so moved the valve member 82 is seated on the valve seat 79 and thus communication between the conduit 89 and the supply chamber 39 is interrupted. At this same time, the valve member 81 is unseated from the valve seat 78 and thus communication between the conduit 89 and the supply chamber 46 is established. Since gas under relatively high pressure is delivered through conduit 89, it is manifest that pressure is impressed on the diaphragm 18 and therefore the valve member 41 remains seated on the valve seat 38. It is therefore apparent that the container connected to the conduit 72 is isolated from the system and may therefore be removed and replaced. The container connected to the conduit 89 may likewise be removed and replaced when the valves are arranged in the manner illustrated in Fig. 3. From the foregoing description it is manifest that I have provided an arrangement whereby a gas supply may normally be withdrawn from the service container, but which arrangement will function to withdraw gas from a reserve container, this occurring when the pressure of the gas from the service container falls to a predetermined low point for any reason whatsoever. It is also apparent that I have so arranged the device that the valve mechanisms may be expeditiously set in proper position to bring about such function. Further, it is apparent that replacement of the containers is greatly facilitated by this arrangement, as either of these containers or both, if so desired, may be isolated from the system.

While I have illustrated and described the selected form of construction of my invention, it is to be understood that this is capable of variations and modification and I therefore do not wish to be limited to the precise details set forth, but desire to avail myself of the invention as set forth in the following claims:

1. In a gas supply which has service and reserve means and a supply line, the combination therewith of a valve positioned intermediate said service and reserve means and said supply line and including a body having a pressure chamber and a reserve chamber therein and two inlet portions respectively connected to the service and supply means, said body having two pairs of passages therein and having the passages of each pair respectively leading from one of said inlet portions to one of said chambers, independent valve means for controlling flow through said pairs of passages whereby communication may be established between each of said inlet portions and either of said chambers as communication is shut off between said inlet portions and the chambers not in communication with said inlet portions, and means connecting said supply line with the pressure chamber.

2. In a gas supply which has service and reserve means and a supply line, the combination therewith of a valve positioned intermediate said service and reserve means and said supply line and including a body having a pressure chamber and a reserve chamber therein and two inlet portions respectively connected to the service and supply means, said body having two pairs of passages therein and having the passages of each pair respectively leading from one of said inlet portions to one of said chambers, independent valve means selectively controlling flow through said pairs of passages whereby flow through one passage of one pair to the pressure chamber and flow through one passage of the other pair to the reserve chamber may be established while flow through the other passages of the pairs is shut off, and means connecting said supply line with the pressure chamber.

3. In a gas supply which has service and reserve means and a supply line, the combination therewith of a valve positioned intermediate said service and reserve means and said supply line and including a body having a pressure chamber and a reserve chamber therein and two inlet portions respectively connected to the service and supply means, said body having two pairs of passages therein and having the passages of each pair respectively leading from one of said inlet portions to one of said chambers, independent valve means for controlling flow through said pairs of passages whereby communication may be established between each of said inlet portions and either of said chambers as communication is shut off between said inlet portions and the chambers not in communication with said inlet portions, means including a part operated by the pressure in said pressure chamber for controlling communication between said pressure and reserve chambers, and means connecting said supply line with the pressure chamber.

4. In a gas supply which has service and reserve means and a supply line, the combination therewith of a valve positioned intermediate said service and reserve means and said supply line and including a body having a pressure chamber and a reserve chamber therein and two inlet portions respectively connected to the service and supply means, said body having two pairs of passages therein and having the passages of each pair respectively leading from one of said inlet portions to one of said chambers, independent valve means selectively controlling flow through said pairs of passages whereby flow through one passage of one pair to the pressure chamber and flow through one passage of the other pair to the reserve chamber may be established while flow through the other passages of the pairs is shut off, means including a part operated by the pressure in said pressure chamber for controlling communication between said pressure and reserve chambers, and means connecting said supply line with the pressure chamber.

5. A valve structure having a pressure chamber, a reserve chamber, two inlet portions, said valve structure having passages herein leading from each of said inlet portions to each of said chambers, valve means for controlling flow through said passages so that either of said inlet portions may be connected to either of said chambers.

6. In a valve including a body having a pressure chamber and a reserve chamber therein, two inlet portions on said body, said body having two pairs of passages therein and having the passages of each pair respectively leading from one of said inlet portions to one of said chambers, and independent valve means for controlling flow through said pairs of passages whereby communication may be established between each of said inlet portions and either of said chambers as communication is shut off between said inlet portions and the chambers not in communication with said inlet portions.

7. A valve structure having a pressure chamber, a supply chamber in constant communication with the pressure chamber, a reserve chamber, two inlet portions, valve means for connecting the supply chamber with one of said inlet portions and for connecting the reserve chamber with the other of said inlet portions, and means for controlling communication between said supply and reserve chambers.

8. A valve structure having a pressure chamber, a supply chamber in constant communication with the pressure chamber, a reserve chamber, two inlet portions, valve means for connecting the supply chamber with one of said inlet portions and for connecting the reserve chamber with the other of said inlet portions, means for controlling communication between said supply and reserve chambers, and means regulated by the pressure in said pressure chamber for operating said controlling means.

9. A valve structure including a body having a pressure chamber, a reserve chamber, two inlet portions, said valve structure having a pair of passages extending between one of said inlet portions and each of said chambers, said valve structure having another pair of passages extending between the other inlet portion and each of said chambers, independent valve means selectively controlling flow through said pairs of passages whereby one of said inlet passages may be connected to the reserve chamber when the other of the reserve passages is connected to the supply chamber.

10. A valve structure including a body having a pressure chamber, a reserve chamber, two inlet portions, said valve structure having a pair of passages extending between one of said inlet portions and each of said chambers, said valve structure having another pair of passages extending between the other inlet portion and each of said chambers, independent valve means selectively controlling flow through said pairs of passages whereby one of said inlet passages may be connected to the reserve chamber when the other of the reserve passages is connected to the supply chamber, and pressure controlled means for regulating communication between said pressure and reserve chambers.

11. A valve structure including a body having a pressure chamber, a reserve chamber, and two inlet portions therein, a valve in said body for selectively connecting one of said inlet portions to either of said chambers, and another valve for connecting the other of said inlet portions to the chamber not connected to the other of said inlet portions, means for controlling communication between said chambers, and adjustable means for regulating operation of said last named means.

12. A valve structure including a body having a pressure chamber, a reserve chamber, and an inlet portion therein, said body having independent passages therein respectively leading to said chambers from said inlet portion, and valve means intermediate said chambers and said inlet portion for alternately opening and closing said passages whereby said inlet portion is alternately connected to one or the other of said chambers.

13. A valve structure including a body having a pressure chamber, a reserve chamber, and two inlet portions therein, said body having passages therein for connecting both of said inlet portions with both of said chambers, manual valve means for alternately opening and closing said passages whereby one of said inlet portions will be connected with only one of said chambers while the other of said inlet portions will be connected with the other of said chambers, said body having an outlet portion therein communicating with said pressure chamber whereby a fluid admitted through the inlet portion connected to said pressure chamber may pass from said valve structure, and pressure controlled means for regulating communication between said pressure and reserve chambers.

14. A valve structure including a body having a pressure chamber, a reserve chamber, and two inlet portions therein, said body having passages therein for connecting both of said inlet portions with both of said chambers, manual valve means for alternately opening and closing said passages whereby one of said inlet portions will be connected with only one of said chambers while the other of said inlet portions will be connected with the other of said chambers, said body having an outlet portion therein communicating with said pressure chamber whereby a fluid admitted through the inlet portion connected to said pressure chamber may pass from said valve structure, and automatic valve means regulating communication between said chambers whereby a fluid admitted through the inlet passage connected to said reserve chamber is prevented from passing into said pressure chamber, said automatic valve means functioning to connect said reserve chamber to said pressure chamber without interrupting communication between said pressure chamber and the inlet connected thereto.

15. A valve structure including a body having a pressure chamber, a reserve chamber, and two inlet portions therein, said body having passages therein for connecting both of said inlet portions with both of said chambers, valve means for alternately opening and closing said passages whereby one of said inlet portions will be connected with only one of said chambers while the other of said inlet portions will be connected with the other of said chambers, said body having an outlet portion therein communicating with said pressure chamber whereby a fluid admitted through the inlet portion connected to said pressure chamber may pass from said valve structure, means for closing passage between said chambers whereby a fluid admitted through the inlet passage connected to said reserve chamber will be prevented from passing into said pressure chamber, and means controlled by the pressure in said pressure chamber for moving said passage closing means from closing position when the pressure in said pressure chamber falls to a predetermined minimum whereby fluid may pass from said reserve chamber into said pressure chamber to pass from said pressure chamber through said outlet portion without interrupting communication between said pressure chamber and the inlet portion connected thereto.

CHARLES L. BASTIAN.